US007653473B2

(12) United States Patent
Yoshida

(10) Patent No.: US 7,653,473 B2
(45) Date of Patent: Jan. 26, 2010

(54) INTER-VEHICLE COMMUNICATION SYSTEM AND METHOD

(75) Inventor: Ichiro Yoshida, Takahama (JP)

(73) Assignee: DENSO Corporation, Kariya (JP)

( * ) Notice: Subject to any disclaimer, the term of this patent is extended or adjusted under 35 U.S.C. 154(b) by 823 days.

(21) Appl. No.: 11/181,559

(22) Filed: Jul. 14, 2005

(65) Prior Publication Data

US 2006/0015242 A1 Jan. 19, 2006

(30) Foreign Application Priority Data

Jul. 14, 2004 (JP) ............................ 2004-207374

(51) Int. Cl.
*B60T 8/32* (2006.01)

(52) U.S. Cl. ........................................................ 701/96

(58) Field of Classification Search .................. 701/93, 701/96; 340/425.5, 435–436
See application file for complete search history.

(56) References Cited

U.S. PATENT DOCUMENTS 6,032,097 A * 2/2000 Iihoshi et al. ................. 701/96
6,356,820 B1 * 3/2002 Hashimoto et al. ............ 701/23

FOREIGN PATENT DOCUMENTS

JP 2002-074577 3/2002

* cited by examiner

*Primary Examiner*—Yonel Beaulieu
(74) *Attorney, Agent, or Firm*—Harness, Dickey & Pierce, PLC

(57) ABSTRACT

An inter-vehicle communication control system, inter-vehicle communication control method, an on-vehicle communication system and a communication state display, usable in an inter-vehicle communication control system, and on-vehicle communication and communication state display methods that enable on-vehicle communication devices to perform inter-vehicle communication, to reduce or prevent collision or intervention with other inter-vehicle communication or road-vehicle communication.

8 Claims, 7 Drawing Sheets

INTER-VEHICLE COMMUNICATION SYSTEM AND METHOD

PRIORITY STATEMENT

This nonprovisional U.S. patent application claims priority under 35 U.S.C. § 119 of Japanese Patent Application No. 2004-207374 filed on Jul. 14, 2004, the entire contents of which are hereby incorporated by reference.

BACKGROUND OF THE INVENTION

1. Field of the Invention

Example embodiments of the present invention relate to inter-vehicle communication control between two or more vehicles. Example embodiments of the present invention also relate to inter-vehicle communication control systems, inter-vehicle communication control methods, on-vehicle communication systems and communication state displays usable in an inter-vehicle communication control system, and on-vehicle communication and communication state display methods.

2. Description of Related Art

JP-A-2002-74577 describes an inter-vehicle communication system for performing inter-vehicle communication between a first on-vehicle communication device, mounted on a first vehicle, and a second on-vehicle communication device, mounted on a second vehicle. The inter-vehicle communication system disclosed in JP-A-2002-74577 does not reduce or prevent collision or intervention between the first and second vehicle and other inter-vehicle communication between other vehicles or other road-vehicle communication between the vehicle and a roadside device. Therefore, the inter-vehicle communication system disclosed in JP-A-2002-74577 also does not monitor the other inter-vehicle communications or the road-vehicle communications and select communication media or communication channels.

SUMMARY OF THE INVENTION

Example embodiments of the present invention provide an inter-vehicle communication control system, inter-vehicle communication control method, an on-vehicle communication system and a communication state display, usable in an inter-vehicle communication control system, and on-vehicle communication and communication state display methods that enable on-vehicle communication devices to perform inter-vehicle communication, to reduce or prevent collision or intervention with other inter-vehicle communication or road-vehicle communication.

Example embodiments of the present invention also provide an inter-vehicle communication control system, inter-vehicle communication control method, an on-vehicle communication system and a communication state display, usable in an inter-vehicle communication control system, and on-vehicle communication and communication state display methods that enable on-vehicle communication devices to perform inter-vehicle communication, to reduce or prevent collision or intervention with other inter-vehicle communication or road-vehicle communication, without complex control.

According to an example embodiment of the present invention, a communication state display mounted on a second vehicle may display information representing a communication state of a second on-vehicle communication device. An on-vehicle communication system mounted on a first vehicle may obtain information from the communication state display. The on-vehicle communication system may analyze the information to determine the communication state of the second on-vehicle communication device and/or to determine a positional relationship between the first and second vehicles. The on-vehicle communication system may indicate an inter-vehicle communication method that may be performed by a first on-vehicle communication device mounted on the first vehicle and the second on-vehicle communication device without affecting other inter-vehicle communication or road-vehicle communication, based on the communication state of the second on-vehicle communication device and/or the positional relationship between the first and second vehicles. The on-vehicle communication system may execute control so that the first and second on-vehicle communication devices perform the inter-vehicle communication based on the specified communication method.

As a result, inter-vehicle communication between the first and second on-vehicle communication devices may be performed to reduce or prevent collision or interference with other inter-vehicle communication or road-vehicle communication. Additionally, inter-vehicle communication between the first and second on-vehicle communication devices may be performed to reduce or prevent collision or interference with other inter-vehicle communication or road-vehicle communication, without complex control.

BRIEF DESCRIPTION OF THE DRAWINGS

Example embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
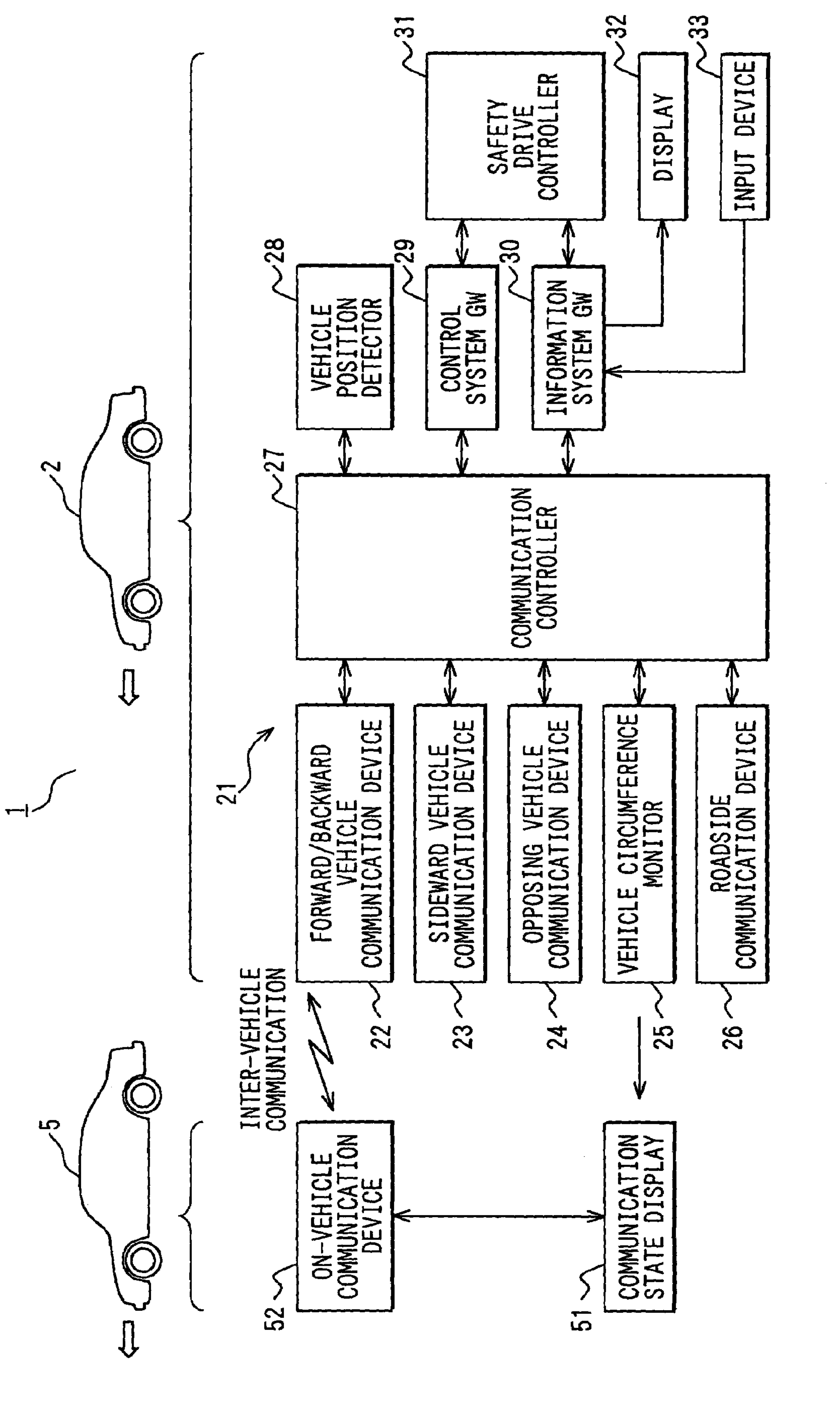
FIG. 1 is a functional block diagram showing an inter-vehicle communication control system according to an example embodiment of the present invention.

FIG. 1 illustrates an inter-vehicle communication control system according to an example embodiment of the present invention. In the example embodiment illustrated in FIG. 1, two vehicles 2, 5 travel in tandem. The following vehicle 2 may have an on-vehicle communication system 21, and the preceding vehicle 5 may have a communication state display 51.

The inter-vehicle communication control system 1 may be comprised of the on-vehicle communication system 21 mounted on the following vehicle 2 and the communication state display 51 mounted on the preceding vehicle 5.

The communication state display 51 may be connected to an on-vehicle communication device 52 mounted on the vehicle 5. The on-vehicle communication device 52 may also perform inter-vehicle communication with one or more on-vehicle communication device mounted on other vehicles (not shown) or road-vehicle communication with a roadside device (not shown). The communication state display 51 may display information representing a communication state of the on-vehicle communication device 52.

Figure 2A:
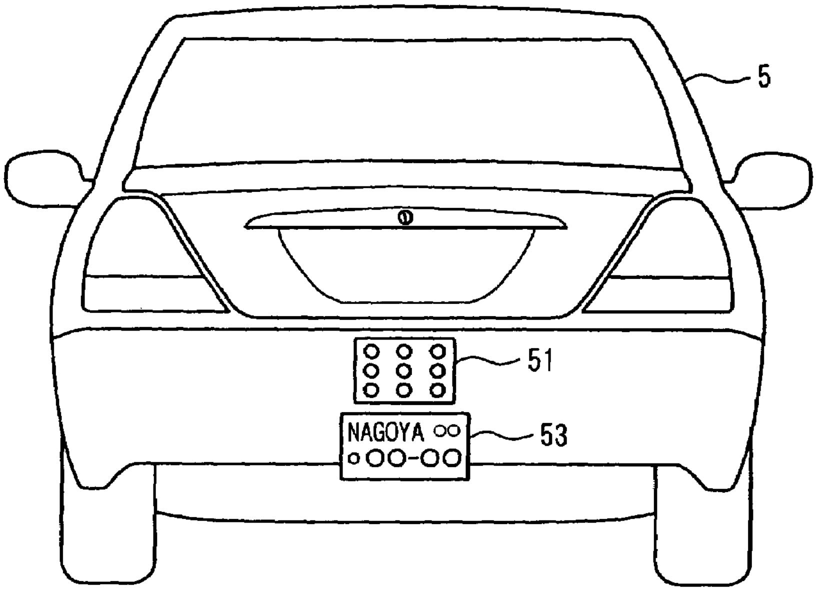
FIG. 2A is a view showing a communication state display mounted on a rear portion of a vehicle according to an example embodiment of the present invention.
Figure 2B:
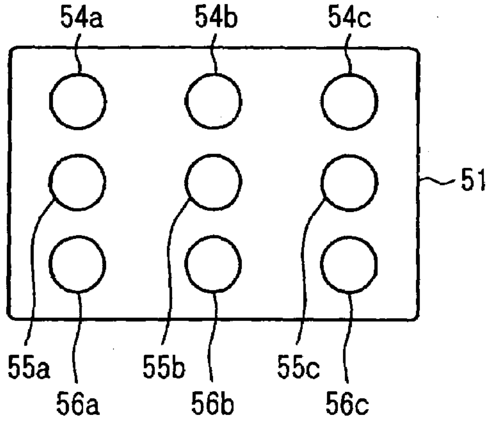
FIG. 2B is a view showing a communication state display according to an example embodiment of the present invention.
Figure 2C:
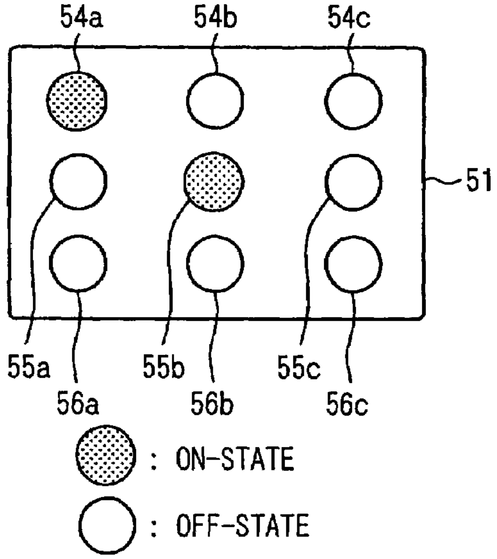
FIG. 2C is a view showing another communication state display according to an example embodiment of the present invention.

In an example embodiment, the communication state display 51 may be mounted above a car registration plate 53 on a rear side of the vehicle as shown in FIG. 2A. As shown in FIGS. 2A-2C, three LEDs (light-emitting diodes) 54*a*-54*c* corresponding to three millimeter wave communication channels, three LEDs 55*a*-55*c* corresponding to three microwave communication channels, and three LEDs 56*a*-56*c* corresponding to three laser communication channels may be arranged on the communication state display 51, for example.

In example embodiments, any type or combination of types of electromagnetic radiation may be employed, including, but not limited to radio, millimeter wave, microwave, infrared, visible, ultraviolet, x-rays, and/or gamma rays.

In an example embodiment, the LEDs 54*a*-54*c*, 55*a*-55*c*, 56*a*-56*c* indicate the status of the communication channel with which they are associated, which is described in more detail below.

In other example embodiments, the communication state display 51 may be disposed at any position in addition to the space above the car registration place 53 as long as an on-vehicle camera mounted on the following vehicle 2 may capture an image of the communication state display 51.

In other example embodiments, other visual indicators, other than LEDs may be used to visually represent the corresponding communication channels.

In other example embodiments, other non-visual indicators may be used to represent the corresponding communication channels.

In other example embodiments, any number of millimeter wave communication channels, microwave communication channels, laser communication channels, and/or other communication channels may be used.

In the example embodiment shown in FIGS. 2A-2C, three LEDs 54*a*-54*c* may correspond to first to third millimeter wave communication channels, respectively. An LED corresponding to a communication channel used in inter-vehicle communication or in road-vehicle communication may be configured in an ON-state (switched on), and an LED corresponding to a channel (vacant channel) not used in inter-vehicle communication or in road-vehicle communication may be configured in an OFF-state (switched off).

For example, as shown in FIG. 2C, the LED 54*a* corresponding to the first millimeter wave communication channel may be configured in the ON-state and the LEDs 54*b*, 54*c* corresponding to the second and third millimeter wave communication channels may be configured in the OFF-state when the on-vehicle communication device 52 uses the first millimeter wave communication channel in the inter-vehicle communication or the road-vehicle communication but does not use the second or third millimeter wave communication channels in inter-vehicle communication or the road-vehicle communication. The LEDs 55*a*-55*c* corresponding to the microwave communication channels and the LEDs 56*a*-56*c* corresponding to the laser communication channels may operate similarly.

Returning to FIG. 1, the on-vehicle communication system 21 mounted on the following vehicle 2 may include a forward/backward vehicle communication device 22, a sideward vehicle communication device 23, an opposing vehicle communication device 24, a vehicle circumference monitor 25, a roadside communication device 26, a communication controller 27, a vehicle position detector 28, a control system gateway (GW) 29, an information system gateway 30, a safety drive controller 31, a display 32 and/or an input device 33.

In an example embodiment, the forward/backward vehicle communication device 22 may perform inter-vehicle communication with an on-vehicle communication device mounted on a vehicle traveling ahead of or behind the own vehicle based on an inter-vehicle communication command signal output from the communication controller 27.

In an example embodiment, the sideward vehicle communication device 23 may perform inter-vehicle communication with an on-vehicle communication device mounted on a vehicle traveling beside the own vehicle based on the inter-vehicle communication command signal outputted from the communication controller 27.

In an example embodiment, the opposing vehicle communication device 24 may perform inter-vehicle communication with an on-vehicle communication device mounted on a vehicle traveling in an opposite direction (for example, a "head-on" direction) to the own vehicle based on the inter-vehicle communication command signal output from the communication controller 27.

In an example embodiment, the vehicle circumference monitor 25 may include an on-vehicle camera for capturing images around the vehicle. Thus, the vehicle circumference monitor 25 may monitor the circumference of the vehicle. The on-vehicle camera may further include a distance metering function to implement a stereo camera. In another example embodiment, multiple on-vehicle cameras may be mounted to capture images in all directions around the vehicle. In an example embodiment, one on-vehicle camera may be mounted to capture an image along a specific direction (frontward or backward direction) from the vehicle. In an example embodiment, a fish-eye lens camera or wide-angle lens camera may be used as the on-vehicle camera.

In an example embodiment, the roadside communication device 26 may perform road-vehicle communication with a roadside device disposed on a roadside or a portable information terminal carried by a person walking on the roadside, based on a road-vehicle communication command signal output from the communication controller 27.

In an example embodiment, the communication controller 27 may be used to control overall operation of the on-vehicle communication system 21, and is discussed in more detail below.

In an example embodiment, the vehicle position detector 28 may include a GPS (global positioning system) receiver, for example. Thus, the vehicle position detector 28 may calculate parameters by demodulating a GPS radio wave transmitted from a GPS satellite to detect a present position of the following vehicle 2.

In an example embodiment, the control system gateway 29 may be interposed between the communication controller 27 and the safety drive controller 31 to control transmitting and receiving of data related to travel of the vehicle.

In an example embodiment, the information system gateway 30 may be interposed between the communication controller 27 and the safety drive controller 31 to control transmitting and receiving of data handled by a user, e.g., data related to various applications such as present position data or destination data.

In an example embodiment, the display 32 may include a liquid crystal display (LCD), for example. The display 32 may be used to display information, e.g., images captured by the on-vehicle camera, based on a control signal inputted by the communication controller 27 through the information system gateway 30.

In an example embodiment, the input device 33 may include a touch panel on the display 32. Thus, the input device 33 may receive commands from the user and may output a command signal corresponding to the user's input to the communication controller 27 through the information system gateway 30.

In other example embodiments, some of the functions of the on-vehicle communication system 21, e.g., the function of detecting the present position of the vehicle 2, the function of displaying the display information, or the function of receiving the manipulation of the user, may be performed by a conventional car navigation system in an example where a car navigation system is mounted on the vehicle 2.

FIGS. 3 to 8B illustrate an example embodiment of operation of the inter-vehicle communication control system 1.

Figure 3:
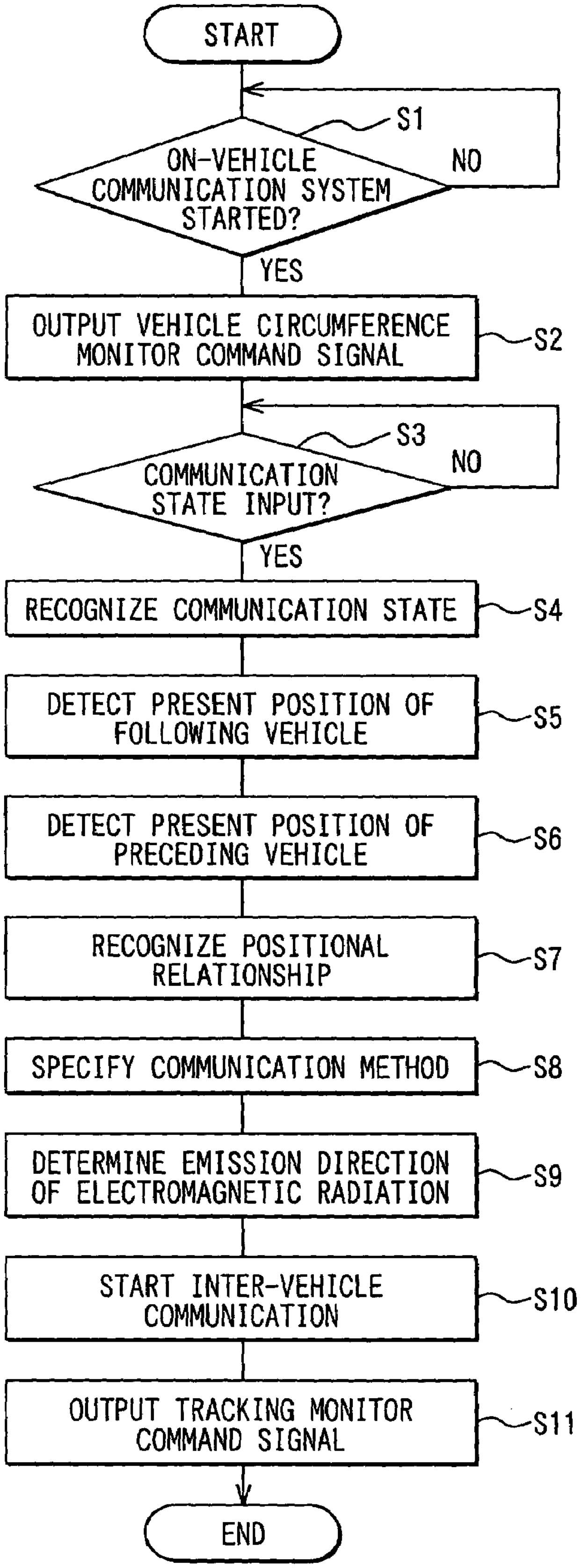
FIG. 3 is a flowchart showing processing performed by a communication controller according to an example embodiment of the present invention.

In an example embodiment, the communication controller 27 may execute the processing as shown in FIG. 3. In an example embodiment, the vehicle circumference monitor 25 may execute the processing in FIGS. 4 and/or 5. In an example embodiment, the on-vehicle communication system 21 is mounted on the following vehicle 2 and the communication state display 51 is mounted on the preceding vehicle 5 as shown in FIG. 1. Further, the forward/backward vehicle communication device 22 mounted on the following vehicle 2 and the on-vehicle communication device 52 mounted on the preceding vehicle 5, may perform inter-vehicle communication.

The communication controller 27 mounted on the following vehicle 2 may output the vehicle circumference monitor command signal to the vehicle circumference monitor 25 at S2 of FIG. 3, if the on-vehicle communication system 21 of the vehicle 2 is started at S1 (YES at S1). Thus, the vehicle circumference monitor 25 may begin to monitor the circumference of the vehicle.

Figure 4:
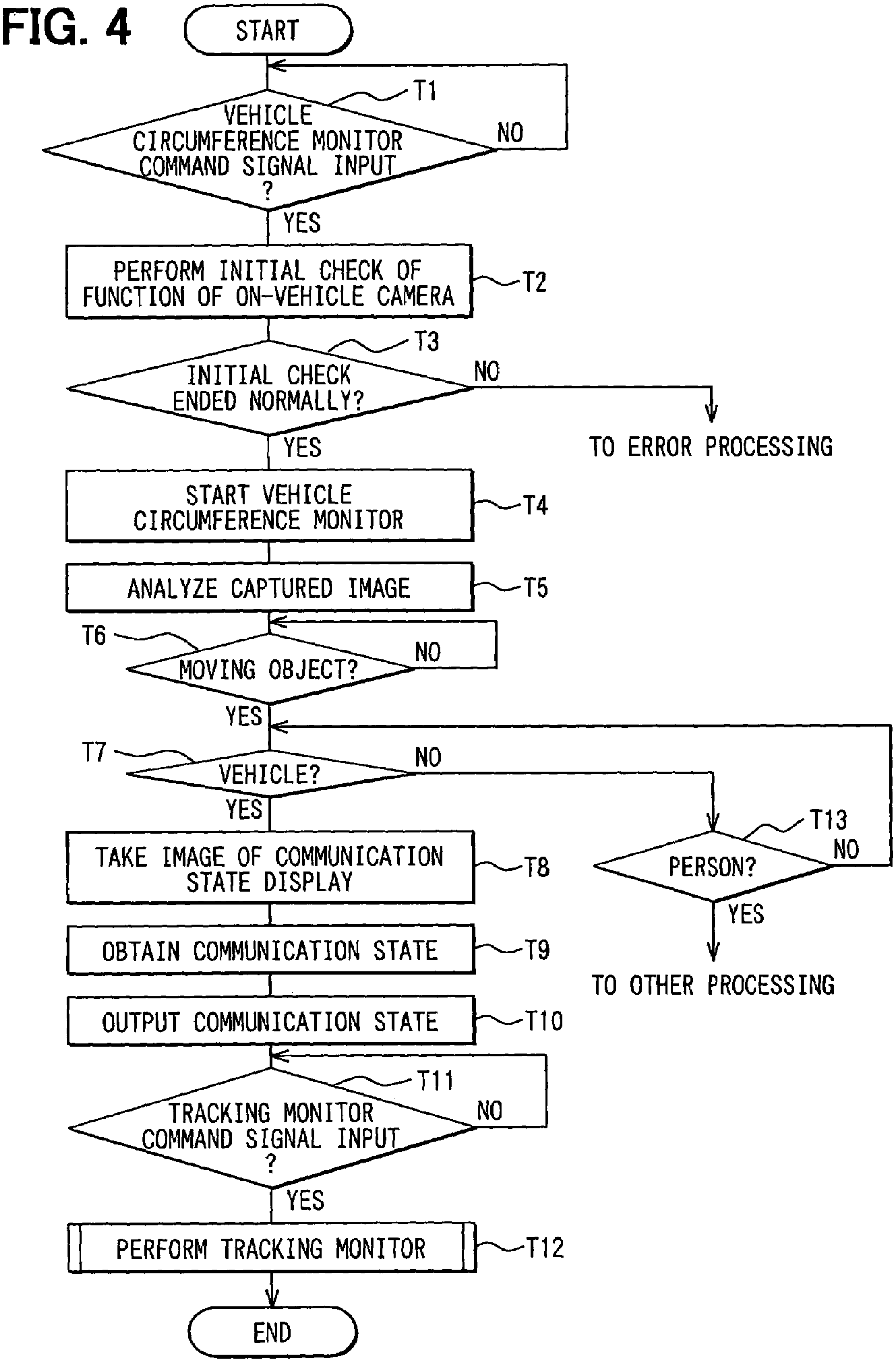
FIG. 4 is a flowchart showing processing performed by a vehicle circumference monitor according to an example embodiment of the present invention.

The vehicle circumference monitor 25 may adjust an image-capturing area and/or focus, based on function checks, which may be set as initial functional checking procedures of the on-vehicle camera in advance, at T2 of FIG. 4, if the vehicle circumference monitor 25 receives a vehicle circumference monitor command signal from the communication controller 27 (YES at T1). The vehicle circumference monitor 25 may begin monitoring the circumference of the vehicle with the on-vehicle camera at T4 if the initial functional checks are finished normally (YES at T3).

The vehicle circumference monitor 25 may analyze the images captured by the on-vehicle camera at T5. Thus, the vehicle circumference monitor 25 may determine whether a moving object is present or not around the vehicle at T6. The moving object may be, for example, a vehicle or a person (pedestrian). The vehicle circumference monitor 25 may determine the type of detected moving object (for example, vehicle or person) using the size and/or shape of a group of pixels, e.g., by comparing the size or shape with a threshold value, at T7 or T13 if the vehicle circumference monitor 25 detects the presence of a moving object around the vehicle (YES at T6).

An example of a case where the vehicle circumference monitor 25 mounted on the following vehicle 2 detects the preceding vehicle 5 as the moving object as shown in FIG. 1 will be explained. The vehicle circumference monitor 25 may detect a mounting position of the communication state display 51 by analyzing the captured image at T8 if the vehicle circumference monitor 25 detects the preceding vehicle 5 as the moving object by determining that the size and/or shape of the group of pixels corresponds to, or is similar to, the vehicle 5 (YES at T7). The vehicle circumference monitor 25 may then capture an image of the communication state display 51 mounted above the car registration plate 53 of the vehicle 5 by setting the image-capturing direction of the on-vehicle camera toward the communication state display 51 at T8. The vehicle circumference monitor 25 analyzes the captured image to obtain the communication state of the on-vehicle communication device 52 mounted on the preceding vehicle 5 at T9.

An example of the displaying state of the communication state display 51 is shown in FIG. 2C. In this example, the LED 54*a* and the LED 55*b* are in an ON-state and the other LEDs 54*b*, 54*c*, 55*a*, 55*c*, 56*a*-56*c* are in an OFF-state. As explained above, the three LEDs 54*a*-54*c* may correspond to millimeter wave communication channels, the three LEDs 55*a*-55*c* may correspond to microwave communication channels, and the three LEDs 56*a*-56*c* may correspond to laser communication channels. In this example, the vehicle circumference monitor 25 may obtain information that the first millimeter wave communication channel 54*a* and the second microwave communication channel 55*b* are used in other inter-vehicle communication or road-vehicle communication but the second and third millimeter wave communication channels 54*b*, 54*c*, the first and third microwave communication channels 55*a*, 55*c*, and the first through third laser communication channels 56*a*, 56*b*, 56*c*, are not used in other inter-vehicle communication or road-vehicle communication. The vehicle circumference monitor 25 may output the obtained communication state of the on-vehicle communication device 52 to the communication controller 27 at T10.

If the communication state of the on-vehicle communication device 52 mounted on the preceding vehicle 5 is input from the vehicle circumference monitor 25 (YES at S3 in FIG. 3), the communication controller 27 can recognize the communication state of the on-vehicle communication device 52 based on the input communication state at S4. In this example, the communication controller 27 may determine that the first millimeter wave communication channel and the second microwave communication channel are used in other inter-vehicle communication or road-vehicle communication but the other communication channels (the second and third millimeter wave communication channels, the first and third microwave communication channels and the first through third laser communication channels) are not used in other inter-vehicle communication or road-vehicle communication.

The communication controller 27 may detect the present position of the vehicle 2 at S5 if the present position of the vehicle 2 is input from the vehicle position detector 28. If the captured image is input from the vehicle circumference monitor 25, the communication controller 27 may detect the present position of the preceding vehicle 5 by analyzing the captured image at S6.

The communication controller 27 can recognize the present positions of the vehicles 2, 5 and can recognize the positional relationship between the vehicles 2, 5 at S7. In an example where it is difficult to detect the present position of the preceding vehicle 5 by analyzing the captured image, the present position of the vehicle 5 may be detected by emitting electromagnetic radiation toward the vehicle 5 and by determining a received state of the reflected electromagnetic radiation.

The communication controller 27 may specify a communication method that can be used between the forward/backward vehicle communication device 22 and the on-vehicle communication device 52 without affecting other road-vehicle communication or inter-vehicle communication based on the communication state of the on-vehicle communication device 52 and the positional relationship between the preceding vehicle 5 and the following vehicle 2 at S8.

In an example embodiment, the communication controller 27 may specify a free communication channel as the communication method, for example, the second millimeter wave communication channel as the communication method of the inter-vehicle communication performed between the on-vehicle communication device 52 and the forward/backward vehicle communication device 22. This is because the first millimeter wave communication channel and the second microwave communication channel are used in the other inter-vehicle communication or road-vehicle communication but the second and third millimeter wave communication channels, the first and third microwave communication channels and the first through third laser communication channels are not used in other inter-vehicle communication or road-vehicle communication. In this case, a suitable communication medium may be selected in accordance with the positional relationship between the following vehicle 2 and the preceding vehicle 5, or the distance between the vehicles 2, 5. Alternatively, a weather information obtaining function may be additionally used and a suitable communication medium may be selected in accordance with a weather condition, for example, a long-wave communication medium may be selected when fog is present.

The communication controller 27 may determine the emitting direction of the electromagnetic radiation so that the on-vehicle communication device 52 can capture the electromagnetic radiation emitted by the forward/backward vehicle communication device 22 at S9. The communication controller 27 may output the inter-vehicle communication command signal to the forward/backward vehicle communication device 22 to start the emission of the electromagnetic radiation from the forward/backward vehicle communication device 22 in the determined emission direction and to start the inter-vehicle communication between the forward/backward vehicle communication device 22 and the on-vehicle communication device 52 based on the specified communication method at S10.

Thus, the on-vehicle communication system 21 mounted on the following vehicle 2 may capture the image of the communication state display 51 mounted on the preceding vehicle 5. The on-vehicle communication system 21 may specify the inter-vehicle communication method, which can be performed by the forward/backward vehicle communication device 22 and the on-vehicle communication device 52 without affecting other road-vehicle communication or inter-vehicle communication, based on the communication state of the on-vehicle communication device 52 and/or the positional relationship between the following vehicle 2 and the preceding vehicle 5. Then, the on-vehicle communication system 21 controls the forward/backward vehicle communication device 22 and the on-vehicle communication device 52 to start the inter-vehicle communication based on the specified communication method.

The vehicle circumference monitor 25 may perform error processing if the initial function checks do not end normally (NO at T3) in the above processing. The vehicle circumference monitor 25 may perform other processing if a person is detected as the moving object (YES at T13).

Returning to FIG. 1, the communication controller 27 may output a tracking monitor command signal to the vehicle circumference monitor 25 at S11 after starting the inter-vehicle communication between the forward/backward vehicle communication device 22 and the on-vehicle communication device 52. Thus, the communication controller 27 may perform the tracking monitor of the preceding vehicle 5 to continue the inter-vehicle communication.

If the tracking monitor command signal is input from the communication controller 27 (YES at T11), the vehicle circumference monitor 25 may perform the tracking monitor processing of the on-vehicle communication device 51 so that the on-vehicle communication device 52 continuously captures the electromagnetic radiation emitted from the forward/backward vehicle communication device 22 thereafter.

Figure 5:
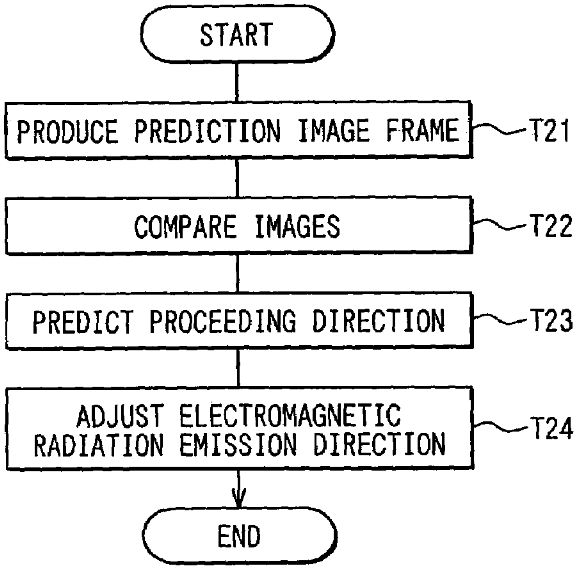
FIG. 5 is a flowchart showing processing performed by the vehicle circumference monitor according to an example embodiment of the present invention.

Another example embodiment of the tracking monitor processing performed by the vehicle circumference monitor 25 is illustrated in FIG. 5.

The vehicle circumference monitor 25 may analyze the captured image and produce a prediction image frame corresponding to an image that should be captured after a given period elapses thereafter at T21 if the tracking monitor processing occurs. The prediction image frame may be a frame corresponding to an image predicted to be captured by the on-vehicle camera when the given period elapses.

Figure 6A:
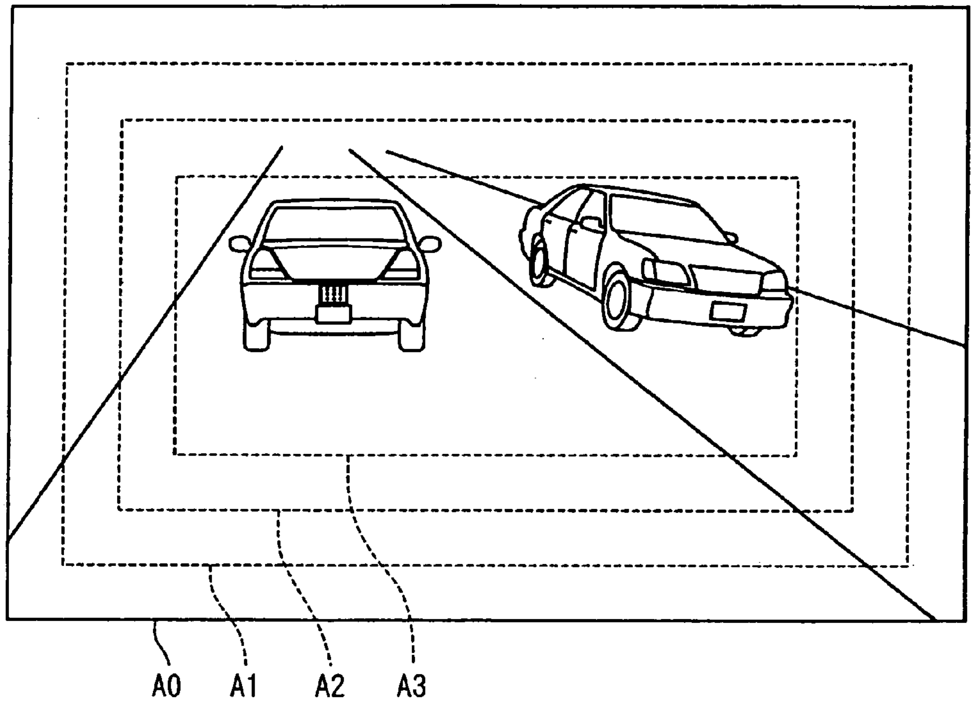
FIG. 6A is a schematic diagram showing prediction image frames according to an example embodiment of the present invention.

An entire area of the captured image is shown by frame A0 in FIG. 6A. Frame A1 in FIG. 6A is a prediction image frame after a time period t1. Frame A2 in FIG. 6A is a prediction image frame after a time period t2. Frame A3 in FIG. 6A is a prediction image frame after a time period t3.

The vehicle circumference monitor 25 may compare an image corresponding to prediction image frame with a presently captured image (actually captured image) at T22 after a given time period elapses. The vehicle circumference monitor 25 may predict a proceeding direction of the preceding vehicle 5 by calculating a difference between the images at T23.

The vehicle circumference monitor 25 may compare an image corresponding to the prediction image frame A1 with a image captured at the time t1 and calculate the difference between the images at the time t1. Thus, the vehicle circumference monitor 25 may predict the proceeding direction of the preceding vehicle 5.

The vehicle circumference monitor 25 may adjust the emission direction of the electromagnetic radiation from the forward/backward vehicle communication device 22 based on the predicted proceeding direction at T24.

The vehicle circumference monitor 25 may recognize a road shape by analyzing the captured images as shown in FIG.

Figure 6B:
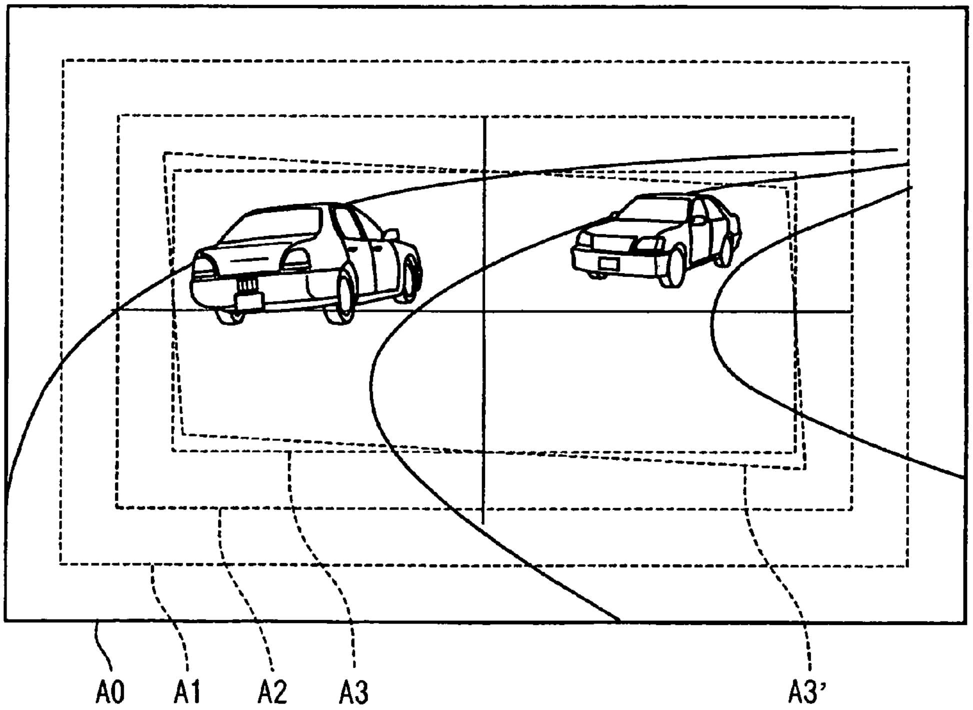
FIG. 6B is a schematic diagram showing the prediction image frames according to an example embodiment of the present invention.

6A. The vehicle circumference monitor 25 may produce the prediction image frames in series without changing the frame shapes (for example, rectangular frames) if the vehicle circumference monitor 25 recognizes that the preceding vehicle 5 and the following vehicle 2 are traveling on a straight road. If the vehicle circumference monitor 25 recognizes that the preceding vehicle 5 and the following vehicle 2 are traveling on a curved road as shown in FIG. 6B, the vehicle circumference monitor 25 may modify the shape of the frames in accordance with curvature of the road and produce the prediction image frames in series, as shown by a frame A3, in FIG. 6B. In an example embodiment, the shape of the road may be obtained from road map data used by a conventional car navigation system.

Thus, the on-vehicle communication system 21 mounted on the following vehicle 2 may begin the emission of the electromagnetic radiation from the forward/backward vehicle communication device 22. The on-vehicle communication system 21 may produce the prediction image frames from the captured image and predict the proceeding direction of the preceding vehicle 5 by comparing the image corresponding to the prediction image frame with the actually captured image. The on-vehicle communication system 21 may adjust the emission direction of the electromagnetic radiation from the forward/backward vehicle communication device 22 based on the predicted proceeding direction.

Figure 7:
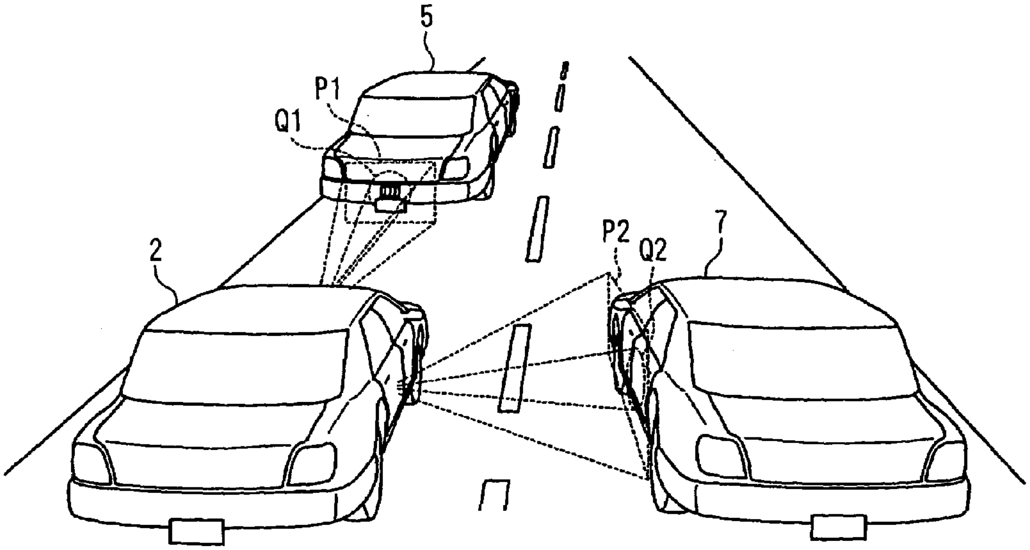
FIG. 7 is a schematic diagram showing a mode of inter-vehicle communication according to an example embodiment of the present invention.

In an example embodiment, the preceding vehicle 5 and the following vehicle 2 may be traveling in tandem as shown in FIG. 7, and the on-vehicle communication system 21 mounted on the following vehicle 2 may capture the image of the communication state display 51 mounted on the preceding vehicle 5. Thus, the forward/backward vehicle communication device 22 mounted on the following vehicle 2 and the on-vehicle communication device 52 mounted on the preceding vehicle 5 may perform the inter-vehicle communication without affecting other inter-vehicle communication or road-vehicle communication.

In an example where the vehicle 2 is traveling abreast with a vehicle 7 as shown in FIG. 7, similar control can be performed with the use of the sideward vehicle communication device 23 to perform inter-vehicle communication without affecting other inter-vehicle communication or road-vehicle communication.

By performing similar control with the use of the opposing vehicle communication device 24, inter-vehicle communication can be performed between opposing vehicles without affecting other inter-vehicle communication or road-vehicle communication.

An image-capturing area of the on-vehicle camera of the following vehicle 2 with respect to the preceding vehicle 5 is shown by an area defined by broken lines P1 in FIG. 7. A communication area (electromagnetic radiation emission area) of the forward/backward vehicle communication device 22 with respect to the preceding vehicle 5 is shown by an area defined by broken lines Q1 in FIG. 7.

An image-capturing area of the on-vehicle camera of the vehicle 2 with respect to the abreast-traveling vehicle 7 is shown by an area defined by broken lines P2 in FIG. 7. A communication area of the sideward vehicle communication device 23 of the vehicle 2 with respect to the abreast-traveling vehicle 7 is shown by an area defined by broken lines Q2 in FIG. 7. Thus, in an example embodiment, the image-capturing areas of the on-vehicle cameras may be wider than the communication areas of the vehicle communication devices 22, 23. Therefore, the emission direction of the electromagnetic radiation or other communication medium can be adjusted by tracking the communication state display 51 and by analyzing the captured image.

Although described primarily in terms of block diagrams and flowcharts above, the example methodology implemented by one or more components of the example system described above may also be embodied in hardware or software as a computer program. For example, a program in accordance with the example embodiments of the present invention may be a computer program product causing a computer to execute a method of controlling inter-vehicle communication performed between a first on-vehicle communication device mounted on a first vehicle and a second on-vehicle communication device mounted on a second vehicle, as described above.

The computer program product may include a computer-readable medium having computer program logic or code portions embodied thereon for enabling a processor of the system to perform one or more functions in accordance with the example methodology described above. The computer program logic may thus cause the processor to perform the example method, or one or more functions of the example method described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAM, ROM, flash memories and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal embodied in a carrier wave. The computer data signal embodying one or more instructions or functions of the example methodology may be carried on a carrier wave for transmission and/or reception by an entity that executes the instructions or functions of the example methodology. For example, the functions or instructions of the example method may be implemented by processing one or more code segments of the carrier wave in a computer controlling one or more of the components of the example system of FIGS. 1-2 and/or the flowcharts of FIGS. 3-5, where instructions or functions may be executed for controlling inter-vehicle communication performed between a first on-vehicle communication device mounted on a first vehicle and a second on-vehicle communication device mounted on a second vehicle, in accordance with the example method outlined in any of FIGS. 1-5.

Further, such programs, when recorded on computer-readable storage media, may be readily stored and distributed. The storage medium, as it is read by a computer, may enable the control of inter-vehicle communication performed between a first on-vehicle communication device mounted on a first vehicle and a second on-vehicle communication device mounted on a second vehicle, in accordance with the example method described herein.

Figure 8A:
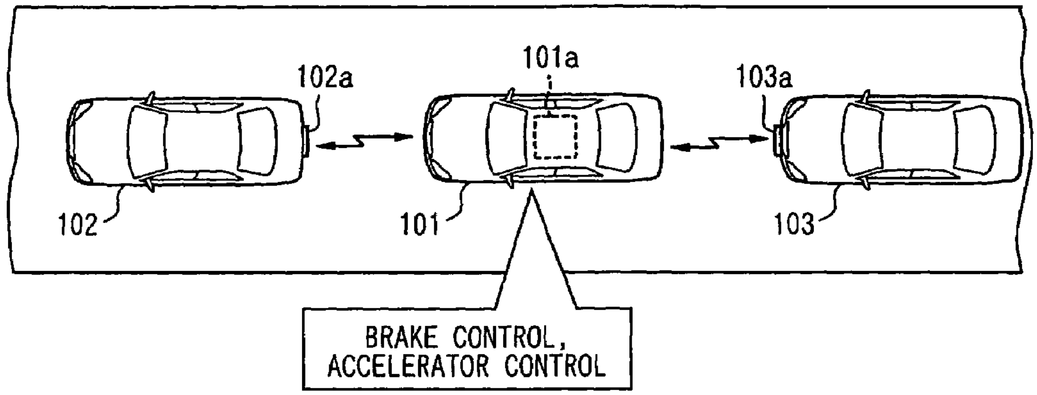
FIG. 8A is a schematic diagram showing another mode of inter-vehicle communication according to another example embodiment of the present invention.

In the above example embodiments, the inter-vehicle communication is performed on one-on-one basis. Alternatively, the inter-vehicle communication may be performed between one vehicle and two or more vehicles. In an example embodiment where three vehicles 101, 102, 103 are traveling in tandem and/or abreast as shown in FIG. 8A, a vehicle circumference monitor of an on-vehicle communication system 101*a* mounted on the middle vehicle 101 may capture an image of a communication state display 102*a* mounted on a rear portion of the preceding vehicle 102 and an image of a communication state display 103*a* mounted on a front portion of the following vehicle 103. The on-vehicle communication system 101*a* may recognize a communication state of an on-vehicle communication device mounted on the preceding vehicle 102 and a communication state of an on-vehicle communication device mounted on the following vehicle 103. The on-vehicle communication system 101*a* may select a communication method that does not affect other inter-vehicle communication or road-vehicle communication performed by the on-vehicle communication devices of the vehicles 102, 103. Thus, the on-vehicle communication system 101*a* may perform inter-vehicle communication with the preceding vehicle 102 and/or the following vehicle 103 while reducing or preventing collision or interference with other inter-vehicle communication or road-vehicle communication.

Traveling information of the preceding vehicle 102 and/or the following vehicle 103, e.g., information related to braking operation, accelerating operation, steering operation, or other vehicular operation, may be obtained through inter-vehicle communication. Thus, the safety drive controller 31 may suitably perform brake control, accelerator control, steering control, or other vehicular control.

Figure 8B:
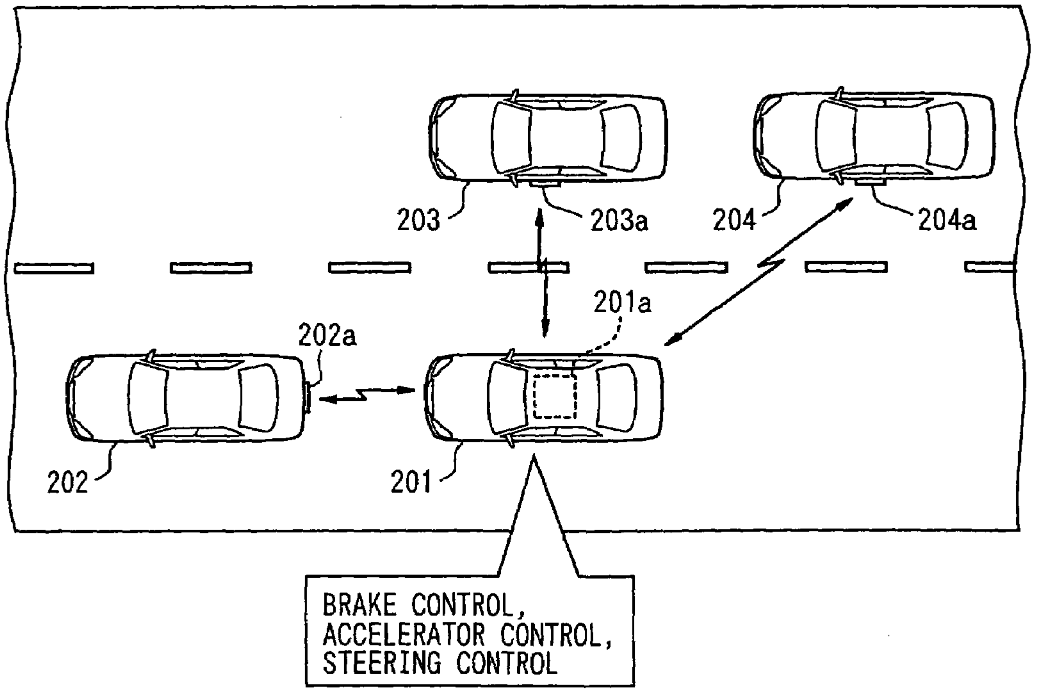
FIG. 8B is a schematic diagram showing yet another mode of inter-vehicle communication according to another example embodiment of the present invention.

In an example embodiment, where four vehicles are traveling in tandem and/or abreast as shown in FIG. 8B, a vehicle circumference monitor of an on-vehicle communication system 201*a* mounted on a vehicle 201 may capture an image of a communication state display 202*a* mounted on a rear portion of a preceding vehicle 202 and images of communication state displays 203*a*, 204*a* mounted on a side of abreast-traveling vehicles 203, 204. By performing control similar to the above control, inter-vehicle communication may be performed with the preceding vehicle 202 and/or with the abreast-traveling vehicles 203, 204 while reducing or preventing collision or interference with other inter-vehicle communication or road-vehicle communication. Traveling information of the preceding vehicle 202 and/or the abreast-traveling vehicles 203, 204 (information related to braking operation, accelerating operation, steering operation, or other vehicular operation) may be obtained through the inter-vehicle communication. Thus, the safety drive controller 31 may suitably perform brake control, accelerator control, steering control, or other vehicular control.

In the inter-vehicle communication control system 1 of example embodiments of the present invention, the communication state display 51 mounted on the preceding vehicle 5 may display the communication state of the on-vehicle communication device 52. The on-vehicle communication system 21 mounted on the following vehicle 2 may capture the image of the communication state display 52 and analyzes the image. The on-vehicle communication system 21 may recognize the communication state of the on-vehicle communication device 51 and recognize the positional relationship between the preceding vehicle 5 and the following vehicle 2. The on-vehicle communication system 21 may specify the communication method that is to be used for the inter-vehicle communication between the forward/backward vehicle communication device 22 and the on-vehicle communication device 52 without affecting other inter-vehicle communication or road-vehicle communication, based on the recognized communication state of the on-vehicle communication device 52 and positional relationship between the vehicles 2, 5. The on-vehicle communication system 21 may control the forward/backward vehicle communication device 22 and/or the on-vehicle communication device 52 to perform the inter-vehicle communication based on the specified communication method. Thus, the forward/backward vehicle communication device 22 mounted on the following vehicle 2 and the on-vehicle communication device 52 mounted on the preceding vehicle 5 may perform the inter-vehicle communication while reducing or preventing collision or interference with other inter-vehicle communication or road-vehicle communication, without requiring complicated control.

In example embodiments of the present invention, the forward/backward vehicle communication device, the sideward vehicle communication device and/or the opposing vehicle communication device may be provided separately. Alternatively, one vehicle communication device having the functions of these devices may be provided.

In example embodiments of the present invention, the communication state display mounted on the preceding vehicle may be provided to display the communication state of the on-vehicle communication device in the form of text information. The on-vehicle communication system mounted on the following vehicle may be equipped with a text recognition function to recognize the text information displayed on the communication state display and to recognize the communication state of the on-vehicle communication device.

In example embodiments of the present invention, a supersonic wave may be used as the communication medium. In the selection of the communication medium, the supersonic wave may be selected when the inter-vehicle communication is performed within a shorter distance and a radio wave may be selected when the inter-vehicle communication is performed over a longer distance. In example embodiments of the present invention, the communication medium may be selected in accordance with a level of directivity required for the inter-vehicle communication. In example embodiments of the present invention, frequency division multiple access (FDMA), time division multiple access (TDMA), code division multiple access (CDMA), or spread spectrum communication may be selected as a communication scheme.

The present invention should not be limited to the disclosed example embodiments, but may be implemented in many other ways without departing from the spirit of the invention.

What is claimed is:

1. An inter-vehicle communication control apparatus for controlling inter-vehicle communication between a first on-vehicle communication device mounted on a first vehicle and a second on-vehicle communication device mounted on a second vehicle, the inter-vehicle communication control apparatus comprising:

a communication state display mounted on the second vehicle configured to display information representing a communication state of the second on-vehicle communication device; and an on-vehicle communication apparatus mounted on the first vehicle configured to receive the information representing the communication state of the second on-vehicle communication device and configured to analyze the received information to determine the communication state of the second on-vehicle communication device and a positional relationship between the first and second vehicles, the on-vehicle communication apparatus being configured to specify an inter-vehicle communication method between the first and second on-vehicle communication devices that does not affect other inter-vehicle communication or road-vehicle communication of the second vehicle, based on the determined communication state of the second communication device and the positional relationship between the first and second vehicles, and to control the first and second on-vehicle communication devices to perform the inter-vehicle communication in accordance with the specified communication method, the communication state display being configured to display a busy state of at least one communication medium of the second on-vehicle communication device; and the on-vehicle communication apparatus being configured to receive the information displayed on the communication state display and analyze the received information to determine the busy state of the at least one communication medium of the second on-vehicle communication device.

2. An inter-vehicle communication control apparatus for controlling inter-vehicle communication between a first on-vehicle communication device mounted on a first vehicle and a second on-vehicle communication device mounted on a second vehicle, the inter-vehicle communication control apparatus comprising:

a communication state display mounted on the second vehicle configured to display information representing a communication state of the second on-vehicle communication device; and an on-vehicle communication apparatus mounted on the first vehicle configured to receive the information representing the communication state of the second on-vehicle communication device and configured to analyze the received information to determine the communication state of the second on-vehicle communication device and a positional relationship between the first and second vehicles, the on-vehicle communication apparatus being configured to specify an inter-vehicle communication method between the first and second on-vehicle communication devices that does not affect other inter-vehicle communication or road-vehicle communication of the second vehicle, based on the determined communication state of the second communication device and the positional relationship between the first and second vehicles, and to control the first and second on-vehicle communication devices to perform the inter-vehicle communication in accordance with the specified communication method, the communication state display being configured to display a busy state of at least one communication channel of the second on-vehicle communication device; and the on-vehicle communication apparatus being configured to receive the information displayed on the communication state display and analyze the received information to determine the busy state of the at least one communication channel of the second on-vehicle communication device.

3. The inter-vehicle communication control apparatus as in claim 1, wherein the on-vehicle communication apparatus is configured to analyze the received information to detect a present position of the second vehicle and to analyze information of the positional relationship between the first and second vehicles.

4. The inter-vehicle communication control apparatus as in claim 1, wherein the information representing a communication state of the second on-vehicle communication device is visual information and the on-vehicle communication apparatus mounted on the first vehicle includes a camera for capturing the visual information.

5. An inter-vehicle communication control apparatus for controlling inter-vehicle communication between a first on-vehicle communication device mounted on a first vehicle and a second on-vehicle communication device mounted on a second vehicle, the inter-vehicle communication control apparatus comprising:

a communication state display mounted on the second vehicle configured to display information representing a communication state of the second on-vehicle communication device; and an on-vehicle communication apparatus mounted on the first vehicle configured to receive the information representing the communication state of the second on-vehicle communication device and configured to analyze the received information to determine the communication state of the second on-vehicle communication device and a positional relationship between the first and second vehicles, the on-vehicle communication apparatus being configured to specify an inter-vehicle communication method between the first and second on-vehicle communication devices that does not affect other inter-vehicle communication or road-vehicle communication of the second vehicle, based on the determined communication state of the second communication device and the positional relationship between the first and second vehicles, wherein the specified communication method includes at least one communication method and at least one communication channel, wherein the at least one communication method includes emission and reception of electromagnetic radiation, the on-vehicle communication apparatus being configured to control the first and second on-vehicle communication devices to perform the inter-vehicle communication in accordance with the specified communication method, the on-vehicle communication apparatus mounted on the first vehicle being configured to determine an emission direction of the electromagnetic radiation emitted from the first on-vehicle communication device based on the positional relationship between the first and second vehicles so that the second on-vehicle communication device captures the electromagnetic radiation and the first on-vehicle communication device emit the electromagnetic radiation along the determined emission direction to begin the inter-vehicle communication between the first and second on-vehicle communication devices, the on-vehicle communication apparatus being configured to generate a prediction image frame corresponding to an image after a given period elapses and, after the first on-vehicle communication device begins emission of the electromagnetic radiation; and the on-vehicle communication system being configured to compare the image, which corresponds to the prediction image frame produced from a previous image, with a present image, and configured to predict a proceeding direction of the second vehicle in order to adjust the emission direction of the electromagnetic radiation emitted from the first on-vehicle communication device.

6. The inter-vehicle communication control apparatus of claim 2, wherein the on-vehicle communication apparatus is configured to analyze the received information to detect a present position of the second vehicle and to analyze information of the positional relationship between the first and second vehicles.

7. The inter-vehicle communication control apparatus of claim 2, wherein the information representing a communication state of the second on-vehicle communication device is visual information and the on-vehicle communication apparatus mounted on the first vehicle includes a camera for capturing the visual information.

8. The inter-vehicle communication control system of claim 5, wherein the electromagnetic radiation includes at least one of radio, millimeter wave, microwave, infrared, visible, ultraviolet, x-rays, gamma rays, and supersonic wave.

* * * * *

UNITED STATES PATENT AND TRADEMARK OFFICE

CERTIFICATE OF CORRECTION

PATENT NO. : 7,653,473 B2
APPLICATION NO. : 11/181559
DATED : January 26, 2010
INVENTOR(S) : Ichiro Yoshida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Twenty-third Day of November, 2010

David J. Kappos

*Director of the United States Patent and Trademark Office*